3,102,111
AZO SULFONAMIDE DERIVATIVES

György Csermely, Budapest, György Lugosi, Felsogod, and Endre Jeney and Tibor Zsolnai, Debrecen, Hungary, assignors to Chinoin Gyogyszer- es Vegyeszeti Termekek Gyara RT., Budapest, Hungary
No Drawing. Filed Aug. 9, 1960, Ser. No. 48,349
Claims priority, application Hungary Aug. 17, 1959
6 Claims. (Cl. 260—154)

This invention relates to certain new pharmaceutically useful sulfonamide derivatives and methods to prepare the same.

It has been found according to the present invention that compounds of the general formula

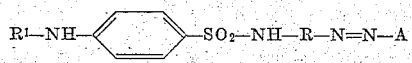

(where $R^1$ stands for a member of the group consisting of hydrogen and acyl, R stands for a member of the group consisting of thiazole, pyrimidine or pyridine ring and A stands for an aromatic cycle) are valuable pharmaceuticals, respectively they may be used as intermediates when preparing pharmaceuticals. The compounds may be used successfully when treating diseases caused by *Staphylococcus aureus* strains, which are resistant against hitherto known sulphonamides and the greater part of which is resistant against the most antibiotics.

It is advantageous to employ these compounds when treating wounds e. g. in cases of furunculosis, impetigo, sycosis barbae, or when treating wounds in postoperative cases especially when subcuration occurs, in cases of chronicus otitis etc. whereby the compounds according to the invention proved to be effective antagonists of gram-positive cocci. The compounds may be used as medicaments when treating pyoderma, in cases of infections of the eyes, burns and generally to avoid infections of wounds. It is especially advantageous that the compounds of the invention do not injure the eye respectively mucous membranes of sensitive patients so that they may be used in the form of ointments, where other ointments could not be adapted.

The compounds according to the invention are effectful against strepto-, staphylo-, and pneumococci. They also have an effect on strains of *Staphylococcus aureus haemolyticus*.

It is supposed, that the acting mechanisms of these compounds differ from those of known sulphonamides.

The heterocycle may contain substituents, such as lower alkyl groups e.g. methyl-groups. The following compounds are especially useful as anticoccidal pharmaceuticals: 2 - (p - amino - benzene - sulfonamido) - 4-methyl-5-(p-chloro-phenyl-azo)-thiazole, 2-(p-amino-benzene-sulfonamido)-4-methyl - 5 - (p - methyl-phenyl-azo)-thiazole, 2 - (p - amino - benzene-sulfonamido)-4-phenyl-5 - (p - methyl - phenyl - azo) - thiazole.

The compounds according to the present invention may be prepared by reacting compounds of the formula

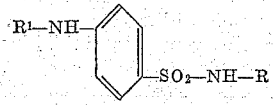

(where R stands for a member of the group consisting of thiazole, pyrimidine and pyridine ring and $R^1$ stands for a member of the group consisting of hydrogen and acyl) with diazotated aromatic amines.

As diazotated amines it is preferable to use diazotated aniline resp. aniline derivatives. Valuable products are obtained when diazotated aniline, halogeno - aniline, alkoxy-aniline, or alkyl aniline is used. Compounds of high anticoccidal activity are obtained when p-substituted derivatives, (such as, e. g., p-chloro-aniline) are employed.

The reaction is preferably carried out in an alkaline medium, e.g., in the presence of alkali-hydroxides, ammonium-hydroxides, alkali or alkaline earth carbonates etc.

It is preferable to use a diazotated amine which was prepared freshly before use and to add it in an aqueous solution to the aqueous solution of the sulfonamide. The solution which contains the sulfonamide is advantageously made alkaline before. By using this preferred method the product is obtained with excellent yields. The reaction may be carried out however in the presence of organic solvents as well.

The compounds of this invention may be used in the form of wound sprayings, ointments for eyes, ointments for wounds, aqueous suspensions, aerosols, and as enterosolvent dragees.

The following ointment proved to be advantageous, e. g., for treatment of the eyes:

|  | G. |
|---|---|
| 2-(p-amino - benzene - sulfonamido)-4-methyl-5-(p-chloro - phenyl - azo) - thiazole | 50 |
| Cholesterine | 20 |
| Paraffine solid | 68.8 |
| Adeps lanae | 106.0 |
| Aqua dest | 348.0 |
| Paraffine liquid | 407.2 |
|  | 1,000 |

Futher details of the invention are to be found in the examples.

Example 1

2.53 g. of p-chloro-aniline are suspended in a solution of 7.5 ml. of water and 5.4 ml. of conc. hydrochloric acid. After cooling with ice 1.4 g. of sodium nitrite are added in aqueous solution, which was cooled with ice. Thereafter the reaction mixture is stirred for about 10 minutes.

The solution of diazotated p-chloroaniline thus obtained is added under intensive stirring to an ice-cold solution of 5.4 g. of 2-(p-aminobenzenesulfonamido)-4-methyl-thiazole in 10 ml. of 30% sodium-hydroxide and 16.5 ml. of acetone. A dark red solution is formed which is filtered after decolorizing with charcoal.

After 15 minutes a light yellow product is precipitated on adjusting the pH value to 5.5 by means of acetic acid. After an hour the product is filtered, washed with water and dried. 7.43 g. of 2-(p-aminobenzene-sulfonamido)-4-methyl-5-(p-chlorophenyl-azo)-thiazole is obtained with a yield of 90%. The product is light yellow. M.P.: 242–243° C.

*Analysis.*—S, percent=15.88 (theory 15.72); N, percent=17.05 (theory 17.20).

This product shows a total inhibiting effect on the growth of *Staphylococcus aureus* and *Staphylococcus albus* strains in a concentration of 1 gmole per 50,000 lit. It shows a total inhibiting action on *Staphylococcus aureus* strains which are resistant on other sulfonamides and antibiotics in a concentration of 1 gmole per 50,000 lit.

The following method was employed for the determination of anticoccidal activity: the compound was dissolved in aqueous sodium hydroxide solution, whereupon different quantities of the solution thus obtained were admixed with a bouillon agar melt. In separate glass cups after solidification the nutrient media were inoculated with Staphylococcus strains and incubated at 37° C. for 24 hours. Each experiment was reproduced three times and only the identical results were accepted.

Example 2

1.87 g. aniline are dissolved in a solution of 50 ml. of water and 5.4 ml. of concentrated hydrochloric acid. 1.4 g. of sodium-nitrite are then added in a solution of 30 ml. of water at a temperature of 0–2° C. while cooling with ice. The reaction mixture is stirred for about 10 minutes.

The solution thus obtained, containing diazotated aniline-HCl is added while stirring intensively to a solution of 5.4 g. of 2-(p-aminobenzenesulfonamido)-4-methyl-thiazole in 100 mls. of 3% sodium hydroxide. After some minutes 150 ml. of water are added to the solution of orange colour and after some standing the reaction mixture is made neutral with a 25% solution of acetic acid. On standing for an hour the product is filtered by suction, washed with water and dried. 6.70 g. of 2-(p-amino-benzene-sulfonamido)-4-methyl-5-(phenyl-azo)-thiazole are obtained with 90% yield. M.P.: 236° C.

*Analysis.*—S, percent=17.5 (theory 17.14); N, percent=17.56 (theory 18.76).

The product shows a total inhibiting action on the growth of *Staphylococcus aureus* strains in a concentration of 1 gmole per 50,000 lit. and a total inhibiting action on the growth of *Staphylococcus auureus* strains which are resistant to other sulfonamides and most of antibiotics in a concentration of 1 gmole/25,000 lit.

Example 3

2.15 g. of p-toluidene are dissolved in 50 ml. of water, containing 4.5 ml. of concentrated hydrochloric acid. The solution is cooled with ice whereupon 1.4 g. of sodium nitrite are added at a temperature between 0° C. and +2° C. in a solution of 30 ml. of water cooled with ice.

After about 10 minutes of stirring the solution containing diazotated p-toluidene-HCl is added to a solution of 5.4 g. of 2-(p-amino-benzene-sulfonamido)-4-methyl-thiazole in 100 ml. of 3% sodium hydroxide. A solution of orange colour is formed. 150 ml. of water are added, whereupon the solution is made neutral by means of a solution of 25% acetic acid. A light yellow product precipitates, which is filtered with suction, washed with water and dried. 7 g. of 2-(p-amino-benzene-sulfonamido)-4-methyl-5-(p-tolyl-azo)-thiazole are obtained. M.P.: 242–243° C. The product may be recrystallized from methanol.

*Analysis.*—S, percent=16.99 (theory 16.53); N, percent=17.56 (theory 18.08).

The product shows a total inhibiting action on the growth of:

| Strains | Concentration |
| --- | --- |
| Staphylococcus aureus | 1 gmole/50,000 lit. |
| Staphylococcus aureus resistant | 1 gmole/50,000 lit. |
| Staphylococcus albus | 1 gmole/50,000 lit. |

Example 4

2.53 g. of p-chloroaniline are diazotated in a solution of 50 ml. of water and 5.4 ml. of concentrated hydrochloric acid with 1.4 g. of sodium nitrite, according to the method described in the previous examples.

The solution obtained is added to a solution of 6.25 g. of 2-(p-acetyl-aminobenzene-sulfonamido)-4-methyl-thiazole and 100 ml. of 3% sodium hydroxide. An orange-red solution is formed. On addition of 150 ml. of water and neutralizing with a 25% solution of acetic acid a light yellow coloured substance is precipitated. The product is filtered, washed with water and dried. 5.9 g. of 2-(p-acetyl-amino-benzene-sulfonamido)-4-methyl-5-(p-chlorophenyl-azo)-thiazole is obtained. M.P.: 240° C.

The product shows a total inhibiting action on the growth of:

| Strains | Concentration |
| --- | --- |
| Staphylococcus aureus | 1 gmole/5,000 lit. |
| Staphylococcus aureus resistant | 1 gmole/5,000 lit. |

Example 5

2.53 g. of p-chloroaniline are diazotated with 1.4 g. of sodium nitrite according to the method described in the previous examples.

The solution containing diazotated p-chloroaniline-HCl is added to a solution of 5.0 g. of p-amino-benzene-sulfonamido-pyridine in 100 ml. of a 3% solution of sodium hydroxide. A solution of orange-red colour is formed which is treated as described in Example 1, whereupon 6.1 g. of 2-(p-amino-benzene-sulfonamido)-5-(p-chlorophenyl-azo)-pyridine are obtained. M.P.: 170° C. (decomp.).

The product shows a total inhibiting action on the growth of:

| Strains | Concentration |
| --- | --- |
| Staphylococcus aureus | 1 gmole/2,500 lit. |
| Staphylococcus aureus resistant | 1 gmole/1,000 lit. |

Example 6

1.87 g. of aniline are diazotated in a solution of hydrochloric acid as described in Example 1, with 1.4 g. of sodium nitrite.

The solution thus obtained containing diazotated aniline-HCl is added to a solution of 5.56 g. of p-amino-benzene-sulfonamido-4,6-dimethylpyrimidine and 100 ml. of a 3% solution of sodium hydroxide. The reaction mixture is treated as described in the previous examples whereupon 6.5 g. of 2-(p-amino-benzene-sulfonamido)-4,6-dimethyl-5-(phenyl-azo)-pyrimidine are obtained. M.P.: 200–201° C. (decomp.).

The product shows a total inhibiting action on the growth of:

| Strains | Concentration |
| --- | --- |
| Staphylococcus aureus | 1 gmole/5,000 lit. |
| Staphylococcus aureus resistant | 1 gmole/1,000 lit. |

Example 7

2.74 g. of p-ethoxy-aniline are diazotated as described in the previous examples with 1.4 g. of sodium nitrite. The solution containing diazotated p-ethoxy-aniline-HCl is added to a solution of 5.4 g. of 2-(p-amino-benzene-sulfonamido)-4-methyl-thiazole in 100 ml. of a 3% aqueous sodium hydroxide solution. 150 ml. of water are added to the solution thus obtained, whereupon the solution is made neutral with a 25% aqueous acetic acid solution. The precipitate is filtered, washed with water and dried. 7.0 g. of 2-(p-amino-benzene-sulfonamido)-4-methyl-5-(p-ethoxy-phenyl-azo) thiazole are obtained. The product may be purified by heating with a great excess of methanol. M.P.: 223–224° C. (decomp.).

The product shows a total inhibiting action on the growth of:

| Strains | Concentration |
| --- | --- |
| Staphylococcus aureus | 1 gmole/50,000 lit. |
| Staphylococcus aureus resistant | 1 gmole/5,000 lit. |

Example 8

2.86 g. of α-naphthylamine are diazotated as described in the previous Examples with 1.4 g. of sodium nitrite.

The solution containing diazotated α-naphthyl-amine-HCl is added to a solution of 5.4 g. of 2-(p-amino-benzene-sulfonamido)-4-methyl-thiazole in 100 ml. of a 3% aqueous sodium hydroxide solution. 150 ml. of water are added to the solution thus obtained, whereupon the solution is made neutral with a 25% aqueous acetic acid solution. The precipitate is filtered, washed with water and dried. 7.2 g. of 2-(p-amino-benzene-sulfonamido)-4-methyl-5-(1-naphthyl-azo)-thiazole are obtained. The product may be purified by heating with a great excess of methanol. M.P.: 216° C. (decomp.).

The product shows a total inhibiting action on the growth of:

| Strains | Concentration |
| --- | --- |
| Staphylococcus aureus | 1 gmole/25,000 lit. |
| Staphylococcus aureus resistant | 1 gmole/5,000 lit. |

Example 9

2.53 g. of p-chloro-aniline is mixed with 50 ml. of water containing 5.4 ml. of conc. hydrochloric acid, whereupon diazotation is carried out as described in the previous examples. The solution containing diazotated p-chloro-aniline is added to a solution of 5.1 g. of 2-(p-amino-benzene-sulfonamido)-thiazole in 100 ml. of a 3% aqueous sodium hydroxide solution. 150 ml. of water is added to the solution thus obtained, whereupon the solution is made neutral with an aqueous acetic acid solution. The precipitate is filtered, washed with water and dried. 6.75 g. of 2-(p-amino-benzene-sulfonamido)-5-(p-chloro-phenyl-azo)-thiazole are obtained. The product may be purified by heating with a great excess of methanol. M.P.: 250° C. (decomp.).

The product shows a total inhibiting action on the growth of:

| Strains | Concentration |
| --- | --- |
| Staphylococcus aureus | 1 gmole/25,000 lit. |
| Staphylococcus aureus resistant | 1 gmole/2,500 lit. |

Example 10

2.15 g. of toluidene are diazotated as described in the previous examples with 1.4 g. of sodium nitrite. The solution thus obtained is added to a solution of 6.84 g. of 2-(p-amino-benzene-sulfonamido)-4-phenyl-thiazole in 100 ml. of a 3% aqueous sodium hydroxide solution. 150 ml. of water are added to the solution, whereupon the solution is made neutral with diluted hydrochloric acid. The precipitate is filtered, washed with water and dried. 7.8 g. of 2-(p-amino-benzene-sulfonamido)-4-phenyl-5-(p-tolyl-azo)-thiazole are obtained. The product may be purified by heating with a great excess of methanol. M.P.: 150–151° C.

The product shows a total inhibiting action on the growth of:

| Strains | Concentration |
| --- | --- |
| Staphylococcus aureus | 1 gmole/50,000 lit. |
| Staphylococcus aureus resistant | 1 gmole/50,000 lit. |
| Staphylococcus albus | 1 gmole/50,000 lit. |

We claim:
1. Compounds of the formula

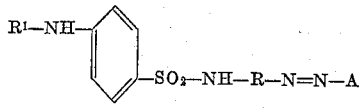

wherein $R^1$ is selected from a member of the group consisting of hydrogen atom and acetyl group, R is a member of the group consisting of the following residues

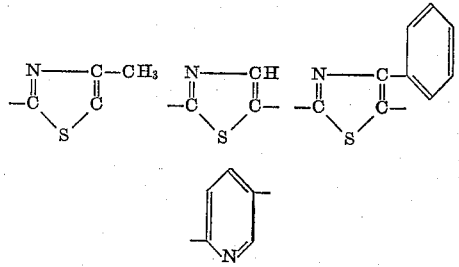

or

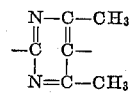

and A is a member of the group consisting of a phenyl, p-methylphenyl, p-ethoxyphenyl, p-chlorophenyl and α-napthyl.

2. The compound of the formula

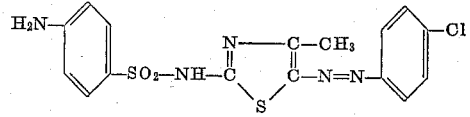

3. The compound of the formula

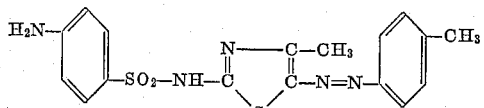

4. The compound of the formula

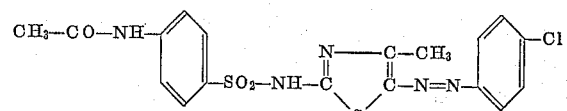

5. The compound of the formula

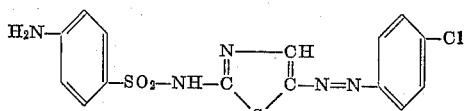

6. The compound of the formula

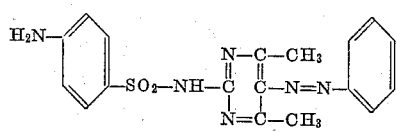

References Cited in the file of this patent
UNITED STATES PATENTS

| | | |
| --- | --- | --- |
| 1,856,602 | Tisza et al. | May 3, 1932 |
| 1,990,923 | Tisza et al. | Feb. 12, 1935 |
| 2,307,650 | Tisza et al. | Jan. 5, 1943 |
| 2,430,439 | Winnek et al. | Nov. 4, 1947 |